Patented Dec. 2, 1947

2,431,969

UNITED STATES PATENT OFFICE 2,431,969

FLUORINATION OF PERCHLOROHEXATRIENE

William S. Struve, Carneys Point, N. J., assignor to the United States of America, as represented by the Atomic Energy Commission No Drawing. Application January 13, 1945, Serial No. 572,737

3 Claims. (Cl. 260—648)

This invention relates to fluorinated organic compounds and to their manufacture.

The invention has for its object the preparation of a new fluorinated organic compound. A further object is the preparation of such a compound from a readily prepared derivative of hexachloropropene.

The product of the invention is valuable as a volatile inert solvent for halogenated organic compounds, as a heat transfer medium, and as a liquid reaction medium for conducting chemical reactions.

The new compound of the present invention contains carbon, chlorine and fluorine and may be represented by the molecular formula $C_6ClF_9$. It is a clear, colorless liquid which boils, at normal atmospheric pressure, at about 75° C., has a density of about 1.67 at 20° C. compared with water at 20° C. and a refractive index (sodium D line) of about 1.32. While I do not wish to be limited to any theory of structure, the stability of the compound to further oxidation indicates that it may contain the carbon skeleton:

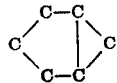

The new chlorofluoro compound may be prepared by fluorinating perchlorohexatriene with antimony pentafluoride at temperatures between 150° C. and 300° C.

Example 300 parts by weight of perchlorohexatriene of 184° C. melting point and analyzing 79% chlorine (obtained by heating perchloropropene with cuprous chloride in ethanol at 35° C. for 26 hours, filtering off liquid from the crystalline product at 20° C. and washing the crystalline product with cold aqueous 20% HCl solution) was mixed with 1500 parts by weight of crude antimony pentafluoride (86% distillable). The mixture was heated in an autoclave at 180° C. for 3 hours. The product was drowned in a mixture of ice and water and the organic layer was washed acid-free and fractionally distilled. The fraction distilling at 74.5° to 76° C. amounted to 60 parts by weight and was separately collected. It was an inert, clear, colorless oil with the following properties: Density 1.666 (20°/20°), refractive index (sodium D line) 1.3202, chlorine content 12.74%, molecular weight 278.5.

It will be understood that I intend to include variations and modifications of the invention and that the preceding example is illustrative only and in no wise to be construed as a limitation upon the invention, the scope of which is defined in the appended claims, wherein I claim:

1. A new chemical compound, liquid at normal temperatures and having a boiling point at normal atmospheric pressure of about 75° C., a density of about 1.67 and a refractive index of about 1.32 and having the molecular formula $C_6ClF_9$.

2. The method of making a chlorofluoro compound of the molecular formula $C_6ClF_9$, which comprises heating perchlorohexatriene with antimony pentafluoride.

3. The method of making a chlorofluoro compound of the molecular formula $C_6ClF_9$, which comprises heating perchlorohexatriene with antimony pentafluoride at a temperature between 150° C. and 300° C. and recovering from the organic reaction product an oil distillate fraction boiling at normal atmospheric pressure mainly at about 75° C.

WILLIAM S. STRUVE.

REFERENCES CITED

The following references are of record in the file of this patent:

UNITED STATES PATENTS

| Number | Name | Date |
|---|---|---|
| 1,677,831 | Krause | July 17, 1928 |
| 1,754,656 | Strosacker | Apr. 15, 1930 |
| 2,146,725 | Dunphy | Feb. 14, 1939 |

OTHER REFERENCES

Mellor, "Comprehense Treatise on Inorganic and Theoretical Chemistry," vol. 9, pages 467–9. (Copy in Div. 59.)